US008880308B2

(12) United States Patent
Dourra et al.

(10) Patent No.: US 8,880,308 B2
(45) Date of Patent: Nov. 4, 2014

(54) METHODS AND SYSTEM FOR USING VEHICLE LONGITUDINAL ACCELERATION FOR TRANSMISSION CONTROL (71) Applicants: Hussein Dourra, Bloomfield, MI (US); Mircea Gradu, Auburn Hills, MI (US); Michael Hall, Orion, MI (US)

(72) Inventors: Hussein Dourra, Bloomfield, MI (US); Mircea Gradu, Auburn Hills, MI (US); Michael Hall, Orion, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 44 days.

(21) Appl. No.: 13/687,712

(22) Filed: Nov. 28, 2012

(65) Prior Publication Data
US 2013/0151093 A1 Jun. 13, 2013

Related U.S. Application Data (60) Provisional application No. 61/569,526, filed on Dec. 12, 2011.

(51) Int. Cl.
G06F 7/00 (2006.01)
G06F 17/00 (2006.01)
G06F 19/00 (2011.01)
F16H 61/02 (2006.01)

(52) U.S. Cl.
CPC ........ F16H 61/0204 (2013.01); F16H 61/0213 (2013.01)
USPC ................. 701/58; 701/59; 701/65; 180/338; 340/439

(58) Field of Classification Search
USPC .......... 701/51, 53, 55, 56, 58, 59, 60, 64, 65, 701/66, 67, 68, 70; 180/271, 282, 337, 338; 340/425.5, 438, 439, 440
See application file for complete search history.

(56) References Cited

U.S. PATENT DOCUMENTS

| 4,665,772 | A | 5/1987 | Greene |
|---|---|---|---|
| 6,188,946 | B1 * | 2/2001 | Suzuki et al. ................... 701/62 |
| 6,526,343 | B2 * | 2/2003 | Saito et al. ...................... 701/51 |
| 8,666,622 | B2 * | 3/2014 | Wurthner et al. ............... 701/60 |
| 2001/0003721 | A1 * | 6/2001 | Saito et al. .................... 477/115 |
| 2006/0293825 | A1 * | 12/2006 | Sporl et al. ...................... 701/93 |
| 2008/0182714 | A1 | 7/2008 | Saitou et al. |
| 2010/0082208 | A1 * | 4/2010 | Asai et al. ....................... 701/58 |

FOREIGN PATENT DOCUMENTS

| DE | 4328893 A1 | 3/1994 |
|---|---|---|
| DE | 19618805 A1 | 11/1997 |
| DE | 10050169 A1 | 5/2002 |
| DE | 102004023337 A1 | 12/2005 |

(Continued)

OTHER PUBLICATIONS

International Search Report dated Apr. 24, 2013 for International Application No. PCT/US2012/067368, International Filing Date Nov. 30, 2012.

(Continued)

Primary Examiner — Thomas Tarcza
Assistant Examiner — Edward Pipala
(74) Attorney, Agent, or Firm — Ralph E Smith (57) ABSTRACT A method and system of improving shift event performance in a vehicle with an automatic transmission. One or more accelerometers in the vehicle are used to sense one or more longitudinal acceleration values. The longitudinal acceleration values or values derived therefrom are compared with predetermined stored values. Shift event behavior is changed in response to differences between the one or more longitudinal acceleration values or values derived therefrom and the predetermined stored values.

20 Claims, 6 Drawing Sheets (56) References Cited

FOREIGN PATENT DOCUMENTS

| DE | 102005013697 A1 | 9/2006 |
|---|---|---|
| DE | 102007006996 A1 | 8/2008 |
| EP | 0507072 A2 | 10/1992 |
| EP | 0744565 A2 | 11/1996 |
| EP | 0831254 B1 | 3/1998 |
| WO | 2012163557 A1 | 12/2012 |

OTHER PUBLICATIONS

Written Opinion dated Apr. 24, 2013 for International Application No. PCT/US2012/067368, International Filing Date Nov. 30, 2012.

* cited by examiner

METHODS AND SYSTEM FOR USING VEHICLE LONGITUDINAL ACCELERATION FOR TRANSMISSION CONTROL

CROSS REFERENCE TO RELATED APPLICATION

This application claims the benefit of U.S. Provisional Ser. No. 61/569,526, filed Dec. 12, 2011.

FIELD

The technology herein relates generally to using a vehicular sensor output to improve control and performance of a vehicle. More particularly, the technology herein relates to using a vehicle's accelerometer output to improve automatic transmission control.

BACKGROUND

Modern vehicles such as automobiles include multiple control systems that regulate the operation of various components of the vehicle. In many cases, the control systems use input data from one or more sensors. The sensors provide data that is used to optimize the vehicle's operation.

One sensor common to many vehicles is an accelerometer. A vehicle's accelerometer senses and outputs the vehicle's longitudinal acceleration $a_{Long}$. Typically, the output of a vehicle's accelerometer is used as an input to other vehicle systems. For example, longitudinal acceleration $a_{Long}$ may be used by a vehicle control system either individually or in combination with other sensor output signals to determine the vehicle's speed or distance traveled, as well as vehicle power.

However, many other vehicle control systems may be improved by incorporating an accelerometer output into their control methods. Specifically, a clutch touch point adaptation system, a clutch control system and a shift schedule system may all be improved by using a longitudinal acceleration $a_{Long}$ output signal from a vehicle's accelerometer.

SUMMARY

In one form, the present disclosure provides a method of improving shift event performance in a vehicle with an automatic transmission. The method includes using an accelerometer in the vehicle to sense one or more longitudinal acceleration values. The longitudinal acceleration values or values derived therefrom are compared with predetermined stored values. Shift event behavior is changed in response to differences between the one or more longitudinal acceleration values or values derived therefrom and the predetermined stored values.

In another form, the present disclosure provides an improved automatic transmission control system in a vehicle. The control system includes one or more accelerometers in the vehicle. The accelerometers are used to sense one or more longitudinal acceleration values. The system also includes one or more processors which compare the longitudinal acceleration values or values derived therefrom with predetermined values stored in memory. The processors also output control signals that change shift event behavior in response to differences between the one or more longitudinal acceleration values or values derived therefrom and the predetermined stored values.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

A vehicle may include one or more control systems to facilitate smooth and efficient automatic gear shifting. For example, one such system is a clutch touch point adaptation system. Other systems referred herein include a clutch shift control system and a shift schedule system. Each of these systems is improved by using a longitudinal acceleration $a_{Long}$ output signal from the vehicle's accelerometer.

Figure 1:
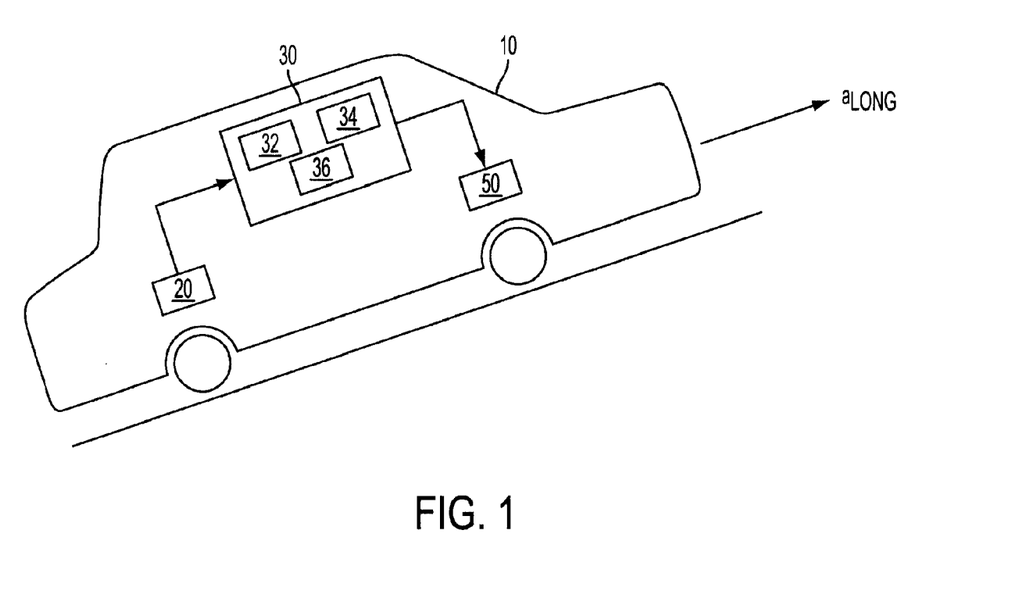
FIG. 1 illustrates a motor vehicle according to the principles of the present disclosure.

FIG. 1 illustrates a vehicle 10 that includes at least one accelerometer 20. The accelerometer 20 measures the vehicle's longitudinal acceleration $a_{Long}$. Longitudinal acceleration $a_{Long}$ is the vehicle's acceleration along the vehicle's driving plane. The vehicle 10 also includes various control systems. For example, vehicle 10 includes a clutch touch point adaptation system 32, a clutch shift control system 34 and a shift schedule system 36. The clutch touch point adaptation system 32, clutch shift control system 34 and shift schedule system 36 may either function as separate individual systems or may be combined into a clutch control system 30. An output signal representing the vehicle's longitudinal acceleration $a_{Long}$ is output from the accelerometer 20 to each of the identified systems. Each of the identified systems function to provide control signals to the vehicle's clutch transmission 50.

The clutch touch point adaptation system 32 is used to adapt or adjust the touch point of a clutch. A clutch touch point is the point or position during engagement of a vehicle's clutch when the clutch just begins to transmit torque. In other words, the clutch touch point is that point or position when the clutch begins to engage. The clutch touch point may be adjusted, either manually or in response to a clutch touch point adaptation system.

A clutch touch point adaptation system typically changes the clutch touch point based on a determined clutch slip speed. A clutch slip speed is the difference between turbine speed (e.g., the turbine rpm) and an output speed (e.g., the drive shaft rpm). For a given clutch setting, a very small clutch slip speed is expected to occur in a specific window during the shift operation. For example, in a first or low gear, the turbine speed is different than the output speed based on gear ratio.

While this difference is expected, sometimes the actual slip speed differs from the expected slip speed. A measured slip speed should be within the expected window for any given clutch setting. However, if the measured slip speed occurs outside the expected window, an assumption is made that the clutch is "slipping" and that the clutch touch point must be adjusted. Accordingly, in traditional clutch touch point adaptation systems, the clutch slip speed is measured and used as an input variable to determine how to adjust the clutch touch point. Generally, if slipping is detected, the clutch touch point is increased.

In a disclosed embodiment, the vehicle's longitudinal acceleration $a_{Long}$ is used instead of or in addition to a clutch slip speed to determine when and how a clutch touch point is to be adjusted. For example, the vehicle's longitudinal acceleration $a_{Long}$ is sensed by an accelerometer during a clutch shift event. A profile of the longitudinal acceleration $a_{Long}$ is recorded during a torque phase of the shift event. The torque phase is that time period to transfer torque between the releasing clutch and the applying clutch during a shift event. The recorded longitudinal acceleration $a_{Long}$ profile is then compared with an ideal longitudinal acceleration $a_{Long}$ profile for the specific shift event. If the profiles match, no adjustment is made. If, however, the profiles do not match (meaning that the measured profile differs from the ideal profile by a measurable amount), then the clutch touch point is adjusted. While the specific adjustment may depend on specific profile differences, in general a steeper measured profile with slip condition should result in the touch point being increased.

The ideal longitudinal acceleration $a_{Long}$ profile is generated during the vehicle's testing process. In ideal conditions, the longitudinal acceleration $a_{Long}$ is measured and profiled during each possible up-shift event. For each shift event, an ideal profile is created (via, e.g., averaging a number of recorded profiles for the specific shift event) and stored in a memory accessible by a processor carrying out the clutch touch point adaptation method.

Figure 2:
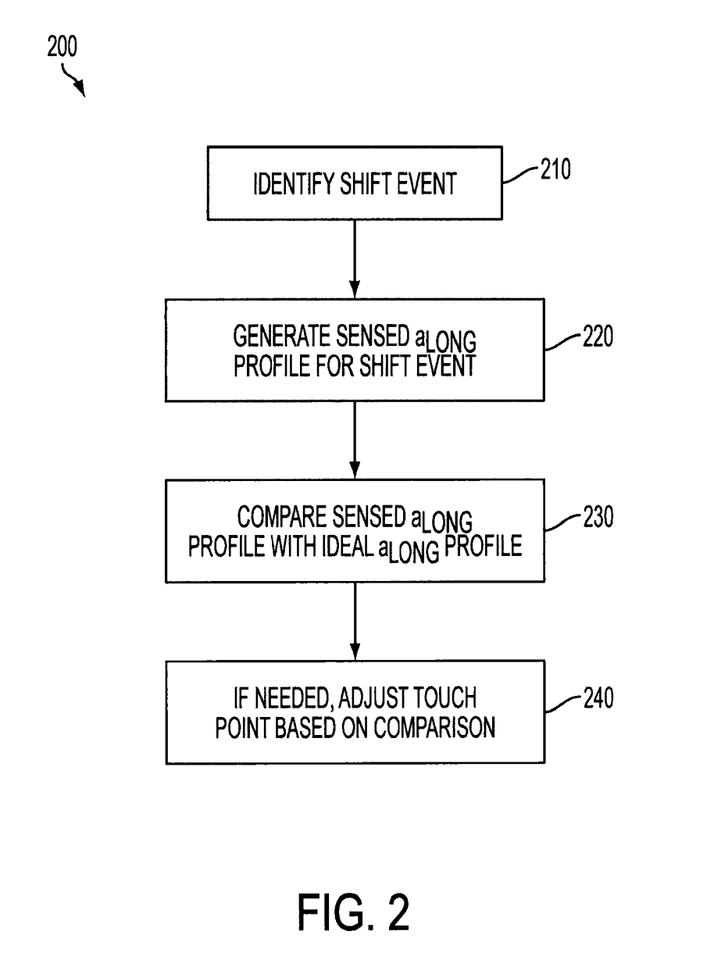
FIG. 2 illustrates a method of using longitudinal acceleration to improve a clutch touch point adaptation system according to the principles of the present disclosure.

FIG. 2 illustrates a method 200 of using the longitudinal acceleration $a_{Long}$ to improve the clutch touch point adaptation system 32. At step 210, the clutch touch point adaptation system 32 identifies a need for a shift event to occur (as dictated, for example, by a shift schedule, described below). The required shift event is identified as a specific shift event to transition from a lower gear to a higher gear. At step 220, the vehicle's longitudinal acceleration $a_{Long}$ is sensed by accelerometer 20 during the identified shift event and a sensed longitudinal acceleration $a_{Long}$ profile is generated. At step 230, the profile of the sensed longitudinal acceleration $a_{Long}$ during a torque phase of the identified shift event is compared to a stored ideal longitudinal acceleration $a_{Long}$ profile for the identified shift event. As an example, the slopes of the profiles are compared. Based on the comparison, the clutch touch point is adjusted in order to shift a subsequently sensed longitudinal accelerations $a_{Long}$ profile to match the stored ideal longitudinal acceleration $a_{Long}$ profile (at step 240).

In another disclosed embodiment, longitudinal acceleration $a_{Long}$ is used as an input to a clutch shift control system. A clutch shift control system is used to control a shift event so that a desired output torque profile occurs. Just as a longitudinal acceleration $a_{Long}$ profile may be measured and recorded, an output torque profile may also be measured and recorded. An efficient gear shift event will generate an ideal output torque profile.

Torque is proportional to angular acceleration and inertial moment. However, because the moment of inertia of a vehicle's driveshaft only changes minimally, the primary variable influencing output torque in a vehicle is angular acceleration. There is a relationship in a vehicle, however, between the angular acceleration of the driveshaft, for example, and the vehicle's longitudinal acceleration $a_{Long}$. Therefore, a vehicle's output torque may be approximated by a relationship involving the vehicle's longitudinal acceleration $a_{Long}$. One approximation is represented by a derivative of the vehicle's longitudinal acceleration $a_{Long}$ profile. Other approximations may be used.

During vehicle testing in idealized conditions, an ideal output torque profile is generated by measuring the vehicle's longitudinal acceleration $a_{Long}$ during specific shift events and by, for example, differentiating the result. During operation of the vehicle during an up-shift event, the vehicle's longitudinal acceleration $a_{Long}$ is recorded and an approximated output torque profile is generated. The generated output torque profile is compared with the ideal output torque profile. If the compared profiles are the same, no adjustment need be made. However, if the compared profiles are different, then an adjustment may be made. The adjustment is made by changing the timing of events within the gear shift event so that a subsequently generated output torque profile for the specific shift event matches the ideal output torque profile for the same event.

Figure 3:
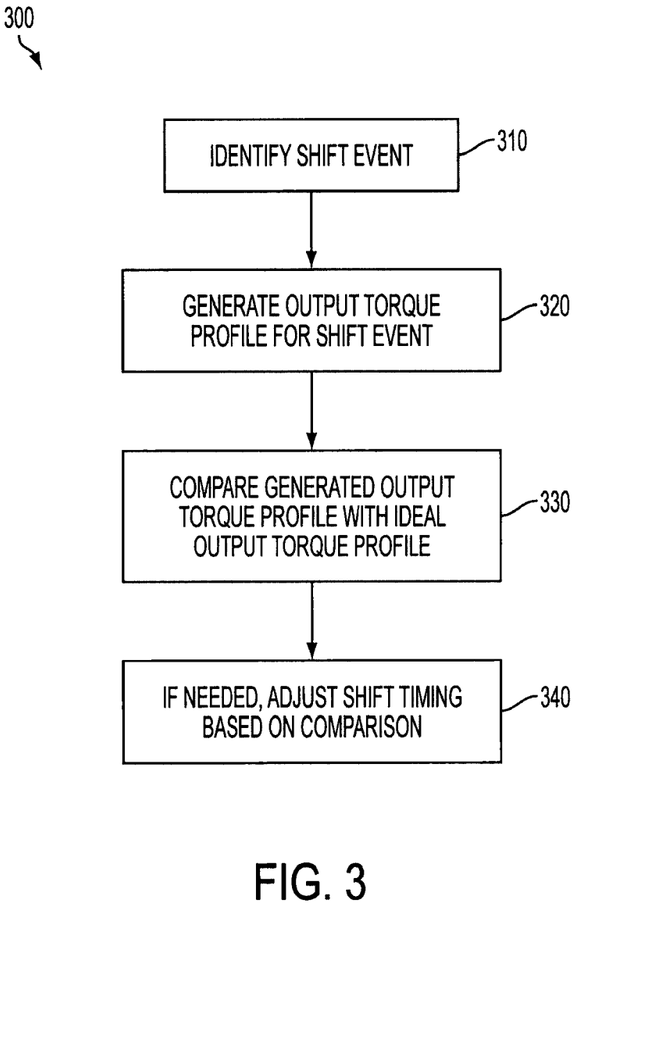
FIG. 3 illustrates a method of using longitudinal acceleration to improve a clutch shift control system according to the principles of the present disclosure.

FIG. 3 illustrates a method 300 of using the longitudinal acceleration $a_{Long}$ to improve the clutch shift control system 34. At step 310, the clutch shift control system 34 identifies a need for a shift event to occur (as dictated, for example, by a shift schedule, described below). The required shift event is identified as a specific shift event to transition from a lower gear to a higher gear. At step 320, the vehicle's longitudinal acceleration $a_{Long}$ is sensed by accelerometer 20 during the identified shift event and a sensed output torque profile is generated. The generated output torque profile is generated using the sensed longitudinal acceleration $a_{Long}$ profile for the shift event. As an example, a derivative of the longitudinal acceleration $a_{Long}$ profile is used to predict shift quality. At step 330, the sensed output torque profile is compared to a stored ideal output torque profile for the identified shift event. The comparison of profiles may include comparing the slopes of the profiles. Based on the comparison, the clutch shift timing is adjusted in order to cause a subsequently generated output torque profile to match the stored output torque profile (at step 340).

A shift schedule control system is also modified by using as an input a vehicle's longitudinal acceleration $a_{Long}$. By comparing the vehicle's wheel acceleration $a_{Wheel}$ to the vehicle's longitudinal acceleration $a_{Long}$, the slope of the driving surface upon which the vehicle is traveling may be determined. By knowing the inclination of the driving surface, a shift schedule is modified in order to inhibit upshifts when acceleration on the sensed grade is not likely to be maintained.

Figure 4:
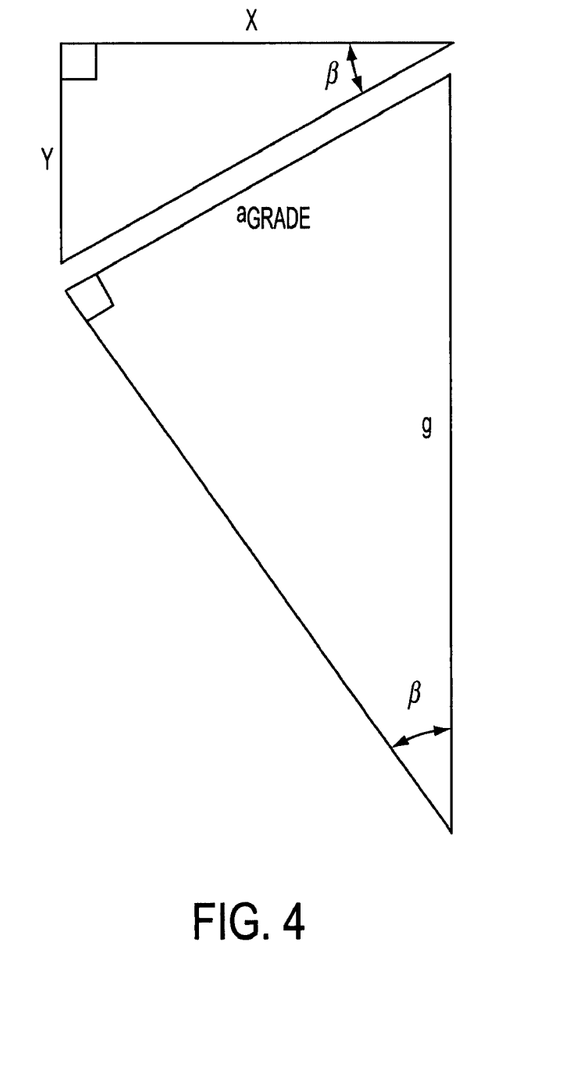
FIG. 4 illustrates a method of determining a driving surface incline based on acceleration measurements according to the principles of the present disclosure.

Referring to FIG. 4, the inclination of a driving surface is given as y/x. The slope is also given as $\tan(\beta)$. In FIG. 4, angle $\beta$ is equal to the arcsin of ($a_{Grade}/g$), where g is the acceleration due to gravity and $a_{Grade}$ is the grade acceleration, or the acceleration component due to the slope or grade of the surface. Thus, the percent grade y/x is given by equation 1. As the value of $\tan(\arcsin(x))$ may be rewritten as $x/(1-x^2)^{1/2}$, equation 1 may be rewritten as equation 2.

$$\frac{y}{x} = \tan(\beta) = \tan\left(\arcsin\left(\frac{a_{Grade}}{g}\right)\right). \quad \text{Equation 1}$$

$$\frac{y}{x} = \frac{a_{Grade}}{g} \bigg/ \sqrt{\left(1 - \left(\frac{a_{Grade}}{g}\right)^2\right)}. \quad \text{Equation 2}$$

Grade acceleration $a_{Grade}$ is equal to the difference between longitudinal acceleration $a_{Long}$ and wheel acceleration $a_{Wheel}$. Thus, equation 2 may be expanded (as in equation 3) and then simplified (as in equation 4) to result in a solution for percent grade y/x in terms of longitudinal acceleration $a_{Long}$ and wheel acceleration $a_{Wheel}$.

$$\frac{y}{x} = \frac{(a_{Long} - a_{Wheel})}{g} \bigg/ \sqrt{\left(1 - \left(\frac{a_{Long} - a_{Wheel}}{g}\right)^2\right)}. \quad \text{Equation 3}$$

$$\frac{y}{x} = \frac{[\text{sign}(g)] \cdot (a_{Long} - a_{Wheel})}{\sqrt{g^2 - (a_{Long} - a_{Wheel})^2}} = \frac{(a_{Long} - a_{Wheel})}{\sqrt{g^2 - (a_{Long} - a_{Wheel})^2}}. \quad \text{Equation 4}$$

A vehicle's wheel acceleration $a_{Wheel}$ is determined as the time derivative of the vehicle's wheel speed. Wheel speed is determined by multiplying a wheel's circumference with the number of rotations of the wheel in a given period of time (for example, rpm). A wheel's circumference is given by $\pi \ast d_{Wheel}$, where $d_{Wheel}$ is the diameter of the wheel. Vehicle sensors are able to measure the rotation of a wheel in minutes, known as the vehicle's RPM. Converting RPM to speed requires converting minutes to seconds. The time derivative of the wheel speed is given by equation 5, where $N_{Out}$ represents output shaft RPM and $R_{Wheel}$ represents the final drive ratio.

$$a_{Wheel} = \frac{\partial N_{Out}}{\partial t} \cdot \frac{(\pi \cdot d_{Wheel})}{60 \cdot R_{Wheel}}. \quad \text{Equation 5}$$

Therefore, as long as the vehicle's longitudinal acceleration $a_{Long}$, wheel diameter $d_{Wheel}$ and wheel rotation period $R_{Wheel}$ are known, the grade of the vehicle's driving surface may be calculated.

Using the calculated grade information, the vehicle can alter its shift schedule. A shift schedule defines when a clutch transmission should shift from one gear to another gear. Typically, shift events are scheduled to occur based on specific trigger events (e.g., reaching threshold engine speeds, torque limits for drivability, hardware limits, etc.). However, when a shift schedule does not include driving surface grade as an input variable, undesirable shift behavior may occur. For example, a vehicle driving up a steep hill in a low gear may achieve a high enough engine speed to trigger a gear shift to a higher gear (based on a typical shift schedule). However, once in the higher gear, the vehicle may be unable to provide enough power to maintain the desired speed on the steep slope. As a consequence, the shift schedule dictates that the vehicle down-shift back to the initial gear. Annoyingly, this can happen multiple times while driving up a single incline.

However, if the shift schedule includes the slope of the driving surface as an input variable, then the shift schedule can be altered to avoid unnecessary up-shifts when the driving surface grade is too high for the vehicle to maintain speed at higher gears.

Figure 5:
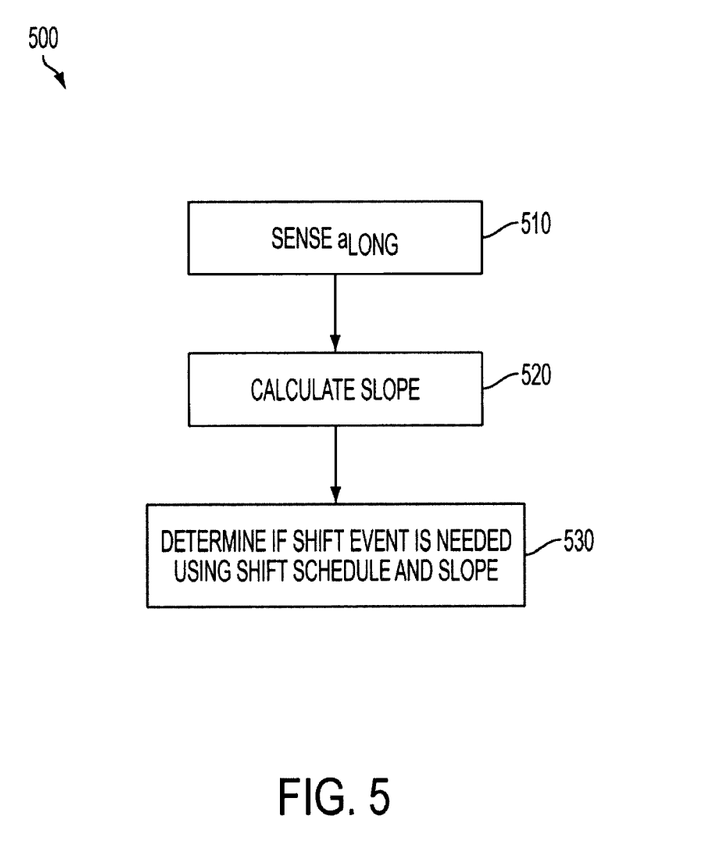
FIG. 5 illustrates a method of using longitudinal acceleration to adjust a shift schedule system according to the principles of the present disclosure.

FIG. 5 illustrates a method 500 of using the longitudinal acceleration $a_{Long}$ to adjust a shift schedule system 36. At step 510, the vehicle's longitudinal acceleration $a_{Long}$ is sensed by accelerometer 20. At step 520, using the sensed longitudinal acceleration $a_{Long}$, the vehicle's driving surface slope is calculated. At step 530, the shift schedule system 36 is used to determine if a gear shift should occur using, as at least one input, the calculated driving surface slope information. If the calculated driving surface slope exceeds a predetermined threshold for a specific shift event, then the shift event does not occur.

Figure 6:
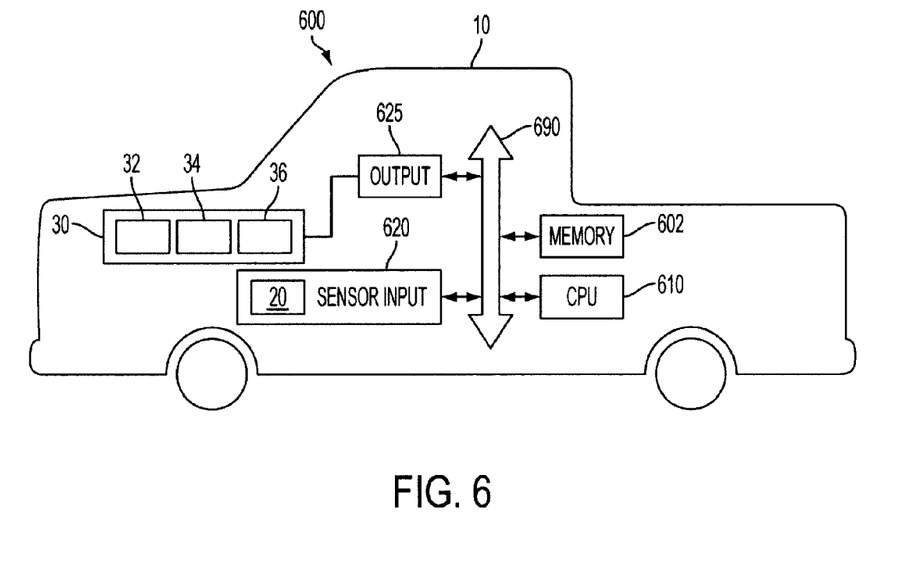
FIG. 6 is a vehicle processing system according to the principles of the present disclosure.

While some aspects of the above disclosure necessarily relate to hardware in a vehicle, methods of determining and applying the above-identified vehicle specifications may be implemented in either software or hardware. FIG. 6 reflects one such embodiment, illustrating a processor system 600 in a vehicle 10. The processor system 600 includes a memory device 602. A processor system, such as a computer system, generally comprises a central processing unit (CPU) 610, such as a microprocessor, a digital signal processor, or other programmable digital logic devices, which communicates with a sensor input 620 and an output device 625 over at least one bus 690. The memory device 602 communicates with the CPU 610 over bus 690 typically through a memory controller. The memory device 602 is used for storing samples obtained through the sensor input 620. The sensor input 620 is coupled to various sensors in the vehicle 10, including an accelerometer 20, among others. The CPU 610 processes data received through the sensor input 620 and outputs results such as longitudinal acceleration $a_{Long}$ profiles, output torque profiles and driving surface slope through the output 625. Output results are used by various systems in vehicle 10 such as the clutch touch point adaptation system 32, clutch shift control system 34 and the shift schedule system 36. Of course, multiple CPUs 610 may be used in system 600, and the entire system 600 could be implemented as a system on a chip (SOC), through integrated circuits (ICs), or through other methods known in the art. Additionally, the clutch touch point adaptation system 32, the clutch shift control system 34 and the shift schedule system 36 may each be integrated into a single clutch control system 30.

What is claimed is:

1. A method of improving shift event performance in a vehicle with an automatic transmission, the method comprising:

using an accelerometer in the vehicle to sense one or more longitudinal acceleration values;

comparing, by a controller, the one or more longitudinal acceleration values or values derived from the one or more longitudinal acceleration values with predetermined stored values; and changing shift event behavior, by the controller, in response to differences between the one or more longitudinal acceleration values or values derived from the one or more longitudinal acceleration values and the predetermined stored values.

2. The method of claim 1, further comprising generating, by the controller, a sensed longitudinal acceleration profile from the one or more longitudinal acceleration values for a specific up-shift event.

3. The method of claim 2, wherein the predetermined stored values are an ideal longitudinal acceleration profile.

4. The method of claim 3, wherein the sensed longitudinal acceleration profile is compared with the ideal longitudinal acceleration profile.

5. The method of claim 4, wherein said comparison includes comparing the slope of the sensed longitudinal acceleration profile with the slope of the ideal longitudinal acceleration profile.

6. The method of claim 4, wherein changing shift event behavior by the controller comprises changing a clutch touch point so that a subsequently generated sensed longitudinal acceleration profile matches the ideal longitudinal acceleration profile if the sensed longitudinal acceleration profile and the ideal longitudinal acceleration profile are different.

7. The method of claim 1, further comprising generating, by the controller, a sensed output torque profile from the one or more longitudinal acceleration values for a specific up-shift event.

8. The method of claim 7, wherein the predetermined stored values are an ideal output torque profile.

9. The method of claim 8, wherein the sensed output torque profile is compared with the ideal output torque profile.

10. The method of claim 9, wherein said comparison includes comparing, by the controller, the slope of the sensed output torque profile with the slope of the ideal output torque profile.

11. The method of claim 9, wherein changing shift event behavior by the controller comprises adjusting shift event timing so that a subsequently generated sensed output torque profile matches the ideal output torque profile if the sensed output torque profile and the ideal output torque profile are different.

12. The method of claim 1, further comprising generating, by the controller, a sensed driving surface slope from the one or more longitudinal acceleration values.

13. The method of claim 12, wherein the predetermined stored values are driving surface slope values, each corresponding to a specific shift event on a shift schedule.

14. The method of claim 13, wherein the sensed driving surface slope is compared with the driving slope value corresponding to a specific shift event on the shift schedule.

15. The method of claim 14, wherein changing shift event behavior by the controller comprises, if the sensed driving surface slope is greater than the driving slope value corresponding to the specific shift event on the shift schedule, delaying the shift event until the sensed driving surface slope is less than or equal to the driving slope value corresponding to the specific shift event on the shift schedule.

16. An automatic transmission control system in a vehicle, said system comprising:
one or more accelerometers for sensing one or more longitudinal acceleration values of the vehicle;
one or more memories for storing predetermined values; and
one or more processors configured to receive a plurality of signals from the one or more accelerometers, to compare the one or more longitudinal acceleration values or values derived from the one or more longitudinal acceleration values with the predetermined stored values, and to output control signals to change shift event behavior in response to differences between the one or more longitudinal acceleration values or values derived from the one or more longitudinal acceleration values and the predetermined stored values.

17. The system of claim 16, wherein the processor is further configured to generate a sensed longitudinal acceleration profile or a sensed output torque profile from the one or more longitudinal acceleration values and compare the sensed longitudinal acceleration profile or sensed output torque profile with the predetermined stored values, which are either an ideal longitudinal acceleration profile for a specific shift event or an ideal output torque profile for the specific shift event.

18. The system of claim 17, further comprising an automatic transmission configured to receive output control signals from the processor, said output control signals instructing the automatic transmission to adjust shift event behavior if either the sensed longitudinal acceleration profile does not match the ideal longitudinal acceleration profile or the sensed output torque profile does not match the ideal output torque profile.

19. The system of claim 16, wherein the processor is further configured to generate a sensed driving surface slope from the one or more longitudinal acceleration values and compare the sensed driving surface slope with the predetermined stored values, which are driving slope values, each corresponding to a specific shift event on a shift schedule.

20. The system of claim 19, further comprising an automatic transmission configured to receive output control signals from the processor, said output control signals instructing the automatic transmission to delay a shift event until the sensed driving surface slope is less than or equal to the driving slope value corresponding to the specific shift event on the shift schedule.

* * * * *